F. A. CUFF.
COLLAPSIBLE HANDLE FOR TIRE PUMPS.
APPLICATION FILED NOV. 12, 1920.
1,432,054. Patented Oct. 17, 1922.
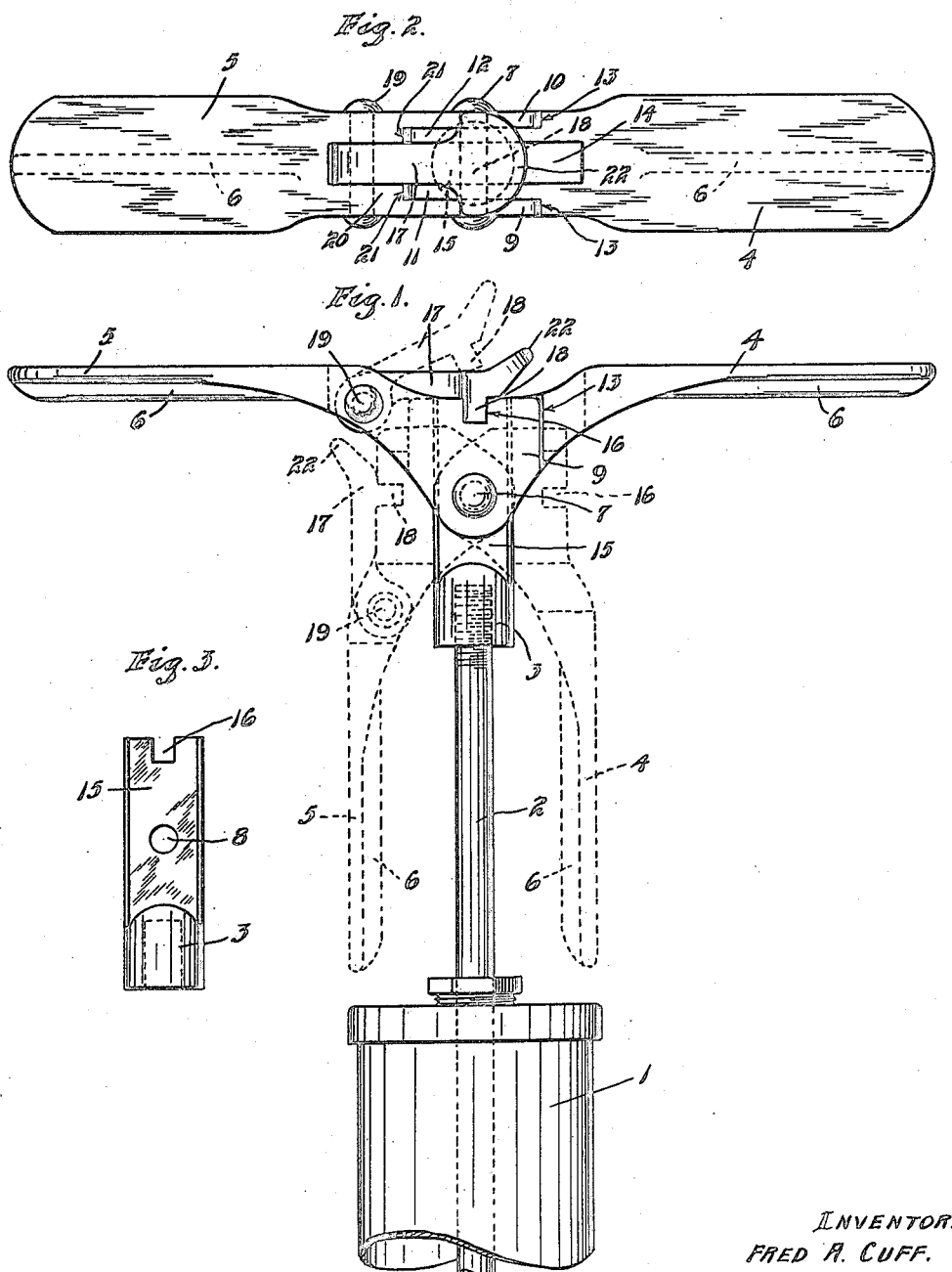
INVENTOR.
FRED A. CUFF.
BY HIS ATTORNEY.
James F. Williamson Patented Oct. 17, 1922.

1,432,054

UNITED STATES PATENT OFFICE.

FRED A. CUFF, OF MINNEAPOLIS, MINNESOTA.

COLLAPSIBLE HANDLE FOR TIRE PUMPS.

Application filed November 12, 1920. Serial No. 423,554.

*To all whom it may concern:*

Be it known that I, FRED A. CUFF, a citizen of the United States, residing at Minneapolis, in the county of Hennepin and State of Minnesota, have invented certain new and useful Improvements in Collapsible Handles for Tire Pumps; and I do hereby declare the following to be a full, clear, and exact description of the invention, such as will enable others skilled in the art to which it appertains to make and use the same.

This invention relates to a collapsible handle and particularly to a handle designed for use with a tire pump. As is well known, a tire pump of considerable size of the type adapted to be held in vertical position and operated by both hands, is today carried in practically every automobile or motorcycle kit of tools, and in the kits of a great many bicycles. The sides of the handle on such a pump require considerable room and form an inconvenient article to carry.

It is an object of this invention therefore, to provide a pump handle which can be readily collapsed so that the same will occupy a small space and can hence be conveniently stored or carried.

It is a further object of the invention to provide such a handle which can be arranged in an operating position with great ease and rapidity and which will be held locked in such a position.

Other objects and advantages of the invention will be apparent from the following description made in connection with the accompanying drawings in which like reference characters refer to the same parts throughout the different views and in which—

Fig. 1 is a view in front elevation of the handle and a portion of the pump to which the same is applied, the handle being shown in collapsed position by dotted lines;

Fig. 2 is a top plan view of the handle; and

Fig. 3 is a view in elevation of a detail.

Referring to the drawings,

The cylinder of an ordinary tire pump is shown as 1, having the pump rod 2, which is formed at its upper end to comprise the head 3, connected by means of threads or otherwise.

The collapsible handle comprises the two oppositely disposed handle portions 4 and 5. These portions 4 and 5 extend a suitable distance on opposite sides of the head member 3 and are formed with ribs or enlarged portions 6 on the under sides to constitute a convenient grip for the hands. The members 4 and 5 are pivoted to the head member 3 by means of pivot 7, which passes through a hole 8 in head 3, and can be formed either as a headed rivet, as illustrated, or as a nutted bolt. The pivot end of the handle 5 is formed as a fork having the arms 9 and 10. These portions of the member 5 project somewhat downwardly and are of the shape clearly illustrated in Fig. 1. The pivoted end of the member 4 is also formed as a bifurcated or fork member having the arms 11 and 12, which are disposed inside of the shoulder portions 13. The width of the fork member of handle 4 is just sufficient to fit smoothly and slidably within the arms 9 and 10 on the member 5. The opening 14 between the fork members 11 and 12 is just of sufficient size to fit smoothly and slidably over the flat portion 15 of the member 3.

A slot 16 is formed transversely through the upper surface of members 4, 5 and 15 and a pawl or dog member 17 has a rectangular projection 18 of the proper size to closely enter and fit in the slot 16. This member 17 is pivoted to the member 5 by means of a pivot 19, which like the pivot 7 may be either a headed rivet as shown, or a nutted bolt. It will be noted that the portions 20 of member 5, through which the rivet passes are of greater thickness than portions 9 and 10 and form therewith the shoulder portions 21.

The shoulder member 17 has its end upwardly turned to form a convenient finger piece 22 by means of which it may be easily lifted from the slot 16.

It will be noted that the inner ends of the handle members 4 and 5 are curved or extended downwardly so that when they are in their downward folded position, these inner ends extend inwardly to the plunger. By so forming the handle members the same are enabled to swing in close to the pump plunger so that the outer edges thereof are substantially in line with the sides of the pump body, as clearly shown in Fig. 1.

When it is desired to use the pump, the handle members 4 and 5 will be lifted to the position shown in Fig. 1 and will then be locked with each other and to the post 3, and maintained in such position by the dog 17. It will be noted that when the projection 18 is fitted in the slot 16, the operation of the pump handle will have a tendency to bind or clamp the portion 18, and the dog 17 will thus be firmly held in position. When it is no longer desired to use the pump, the dog 17 will be lifted by means of the finger piece 22 and the handle members 4 and 5 will then drop to the position shown by dotted lines in Fig. 1. When in this position, the pump can be conveniently placed in the tool box or other desired location. The inconvenient and awkward projection of the handle will thus be eliminated.

It will be, of course, understood that various changes may be made in the form, size and details of the device, without departing from the scope of the applicant's invention, which generally stated consists in the matter shown and described and set forth in the appended claims.

What is claimed is:

1. A collapsible handle for a tire pump having in combination a head member adapted to be secured to the pump plunger, oppositely disposed handle members pivoted to said head member, constructed and arranged to swing into position substantially parellel with the pump plunger and a single means for locking said handle members in oppositely extending positions.

2. A collapsible handle having in combination a central supporting member, a handle member normally disposed at right angles thereto and having its inner end constructed and arranged to engage said supporting member, a second oppositely disposed handle member also extending at right angles to the central supporting member and having its inner end constructed and arranged to engage the end of the first mentioned handle member said handle members being pivoted to said supporting member, and a latch means for holding said handles normally disposed.

3. A folding handle having in combination a central supporting member, oppositely disposed handle portions pivoted thereto and disposed normal to the axis thereof, said central and handle members having a recess formed transversely therethrough and a pivoted locking member having a projection adapted to engage in said recess.

4. A collapsible handle having in combination a central supporting member, having its upper portion of substantial rectangular form and having a slot extending transversely across its upper surface and a handle member having a bifurcated end portion adapted to embrace said central member and a second oppositely disposed handle member having a bifurcated end adapted to embrace the bifurcated end of the first mentioned handle member, both of said handle members having a slot formed in their bifurcated portions in alignment with the slot of the central member, and a pivoted dog carried by one of said handle members and having a projection adapted to engage the slots in all of said members.

5. A collapsible handle having in combination a head member having a flat portion with parallel sides at its upper end, a handle portion disposed normal to the axis thereof and having a bifurcated end engaging said flat portion, a second oppositely disposed handle member having a bifurcated end adapted to engage the bifurcated end of said first mentioned handle member a pivot connecting all of said members and a latching means for holding said handles in normal position.

6. The combination with the plunger of a tire pump, a folding handle comprising oppositely extending members carried by and pivoted to the end of said plunger, means for locking the handles in extended operative position, said handles being adapted to fold into substantial parallelism with the axis of said plunger and having their ends formed to extend inwardly when in folded position, said ends being pivoted within the projection of the sides of the pump body.

7. A collapsible handle for a tire pump having in combination a member connected to the pump plunger, oppositely extending handle members pivoted to said member and constructed and arranged to swing downwardly into folded position with their top sides substantially parallel with and in substantial alinement with the sides of the pump body, and a latching means adapted to hold said handle members extended at substantially right angles to the axis of said pump body.

8. A collapsible handle for a tire pump having in combination a pair of oppositely extending handle members adapted to be secured to the pump plunger, said handle members being pivoted to swing downwardly into position substantially parallel with the pump plunger, the pivotal point of said handles being located substantially in alinement with the axis of the pump plunger, and a latching means for holding said handles extended.

9. A collapsible handle for a tire pump comprising a pair of oppositely extending handle members secured to the pump plunger and pivoted to swing downwardly with their top sides in substantial parallel relation with said plunger, said handles having their inner ends in engagement, and a latch carried by one of said handle members and engaging the other to hold said members in extended position.

10. The combination with a tire pump having an operating plunger, of oppositely extended handle members pivotally connected to said plunger to swing in vertical planes, said handle members being constructed and arranged to swing downwardly into folded position with their outer sides substantially parallel with and in substantial alinement with the side of the pump body, and a locking means adapted to hold said handle members extended at substantially right angles to the axis of said plunger.

In testimony whereof I affix my signature.

FRED A. CUFF.